(12) United States Patent
Ryu et al.

(10) Patent No.: US 8,767,696 B2
(45) Date of Patent: Jul. 1, 2014

(54) SYSTEM AND METHOD FOR MEDIA ACCESS CONTROL FOR A DUTY CYCLE NETWORK

(75) Inventors: Bong K. Ryu, Poway, CA (US); Liangping Ma, San Diego, CA (US); Hua Zhu, San Diego, CA (US); Zhensheng Zhang, San Diego, CA (US)

(73) Assignee: The Boeing Company, Chicago, IL (US)

( * ) Notice: Subject to any disclaimer, the term of this patent is extended or adjusted under 35 U.S.C. 154(b) by 1384 days.

(21) Appl. No.: 12/219,510

(22) Filed: Jul. 23, 2008

(65) Prior Publication Data

US 2009/0046611 A1 Feb. 19, 2009

Related U.S. Application Data

(60) Provisional application No. 60/935,020, filed on Jul. 23, 2007.

(51) Int. Cl.
*H04W 4/00* (2009.01)
*H04B 7/212* (2006.01)
*H04J 3/06* (2006.01)

(52) U.S. Cl.
USPC ........... 370/341; 370/348; 370/350; 713/320; 713/330; 713/340; 700/296

(58) Field of Classification Search
USPC .......... 375/354, 356, 362–366; 713/300, 310, 713/320, 322, 323, 330, 340; 700/296; 370/310–350, 431, 441; 455/456.4
See application file for complete search history.

(56) References Cited

U.S. PATENT DOCUMENTS

| | | | |
|---|---|---|---|
| 6,791,949 B1 * | 9/2004 | Ryu et al. | 370/254 |
| 7,738,433 B2 * | 6/2010 | Tao | 370/338 |
| 2003/0202524 A1 * | 10/2003 | Conner et al. | 370/408 |
| 2004/0031054 A1 * | 2/2004 | Dankworth et al. | 725/86 |
| 2005/0058233 A1 * | 3/2005 | Nguyen et al. | 375/354 |
| 2006/0203795 A1 * | 9/2006 | Welborn et al. | 370/345 |
| 2007/0076762 A1 * | 4/2007 | Manjeshwar et al. | 370/503 |
| 2008/0062865 A1 * | 3/2008 | Neugebauer | 370/229 |
| 2008/0095193 A1 * | 4/2008 | Gaedke et al. | 370/473 |
| 2008/0261663 A1 * | 10/2008 | Park et al. | 455/574 |
| 2009/0046611 A1 * | 2/2009 | Ryu et al. | 370/311 |

* cited by examiner

*Primary Examiner* — Benjamin H Elliott, IV
(74) *Attorney, Agent, or Firm* — Armstrong Teasdale LLP

(57) ABSTRACT

A system and method for medium access control in a wireless communication network including the use of packets having a header and plural data portions, acknowledgement request features, corrupt packet identification, and adaptive duty cycling.

10 Claims, 7 Drawing Sheets

SYSTEM AND METHOD FOR MEDIA ACCESS CONTROL FOR A DUTY CYCLE NETWORK

This application claims the benefit of U.S. Provisional Patent Application Ser. No. 60/935,020, filed on Jul. 23, 2007, the disclosure of which is hereby incorporated by reference.

Ideally, a duty-cycled wireless data network should be energy efficient, reliable, and responsive. Energy efficiency is an important performance metric since wireless devices are typically battery powered and an energy-inefficient radio requires frequent battery change or recharging. Battery replacement may be costly not only because of the labor cost involved in accessing the deployment sites such as remote areas and changing or recharging the batteries, but also in providing communications during an outage for critical systems.

The contributors to energy consumption of a wireless device include radio transmission, radio receiving, idle listening, and other processing. If the traffic load is low, the energy spent on radio transmission and receiving accounts only for a small portion of the total energy consumption, and idle listening together with other processing accounts for the rest of the total energy consumption. Therefore, for wireless data networks such as a typical wireless sensor network where the traffic load is light, significant energy savings can be achieved by putting the radios in the sleep mode most of the time and waking them up only when there is a need for potential communication. This methodology is called duty cycling.

To make duty cycling work properly, it is crucial to synchronize the wake up times of wireless devices since two wireless devices can communicate only if they rendezvous at the right time instants. Various medium access control (MAC) protocols have been proposed in prior art to enable correct rendezvous. Two examples are BMAC, and UBMAC. In BMAC, the transmitter uses a long preamble that is longer than the time interval of the wake up cycle so that the receiver is guaranteed to wake up during the transmission of a packet. In UBMAC, the transmitter estimates when the receiver will wake up and transmits the packet just before the receiver wakes up.

In existing MAC protocols, for a single wake up, a receiver receives at most one packet. This has two ramifications on the performance of the network. One is energy efficiency. For example in the case of BMAC, if multiple packets are ready for transmission at a transmitter, overhead costs are incurred every time a transmission happens. Therefore, each packet introduces a fixed communication overhead, which is the transmission of a preamble of the length of the wake up interval. The other ramification is the delay introduced by the transmission of multiple packets. The amount of time that it takes to transmit multiple packets is at least equal to the number of packets times the duration of a wake up cycle. Additionally, in existing designs for energy-constrained wireless systems, when duty cycling is used, all the nodes in the network adopt the same duty cycle. That is, all nodes spend the same portion of time in the sleep mode as in the wakeup mode. This may not tap the full potential of energy efficiency and responsiveness, especially for heterogeneous wireless networks where some nodes have ample energy resources whereas others nodes do not. That is, the heterogeneity in the energy resource of the nodes could play an important role in determining the duty cycle of the nodes.

Another important performance metric is reliability. Wireless communication links are inherently unreliable. As a result, a transmitted packet may get lost. In general, the network performance is improved by introducing reliability enhancement mechanisms at each wireless link. Such enhancement mechanism may include the well known techniques of Stop and Wait, and Selective Repeat. However, for mesh duty-cycled wireless data networks, no such mechanisms have been considered up to now because these types of networks are new and involve unique constraints that have not been addressed by prior art methods. It is worthwhile to find an efficient way to introduce such known mechanisms to duty-cycled wireless data networks.

A third important performance metric is responsiveness. In a duty-cycled wireless data network, the wireless devices wake up periodically, and the period is usually preset for the sake of simplicity. For some wireless applications, such as environmental monitoring, a fixed duty cycle provides good enough performance. However, in some other applications, such as intrusion detection, the timing requirement is much more stringent, and the use of a fixed duty cycle may not be sufficient.

SUMMARY

The present disclosure is directed to a significant improvement of the energy efficiency, reliability, and responsiveness of duty-cycled wireless data networks by enabling the transmission of a train of packets, adding sophisticated feedback mechanisms to data transfer at each wireless link, and using a dual mode of network operation to handle both delay sensitive traffic and delay insensitive traffic.

BRIEF DESCRIPTION OF THE DRAWINGS

These and other aspects will now be described in detail with reference to the following drawings.

DETAILED DESCRIPTION

For many wireless data networks such as a sensor network, one of the most important performance metrics is energy efficiency since the wireless devices are typically battery powered and if the radios are not energy efficient, power management issues may seriously impair the performance of the network.

Figure 1:
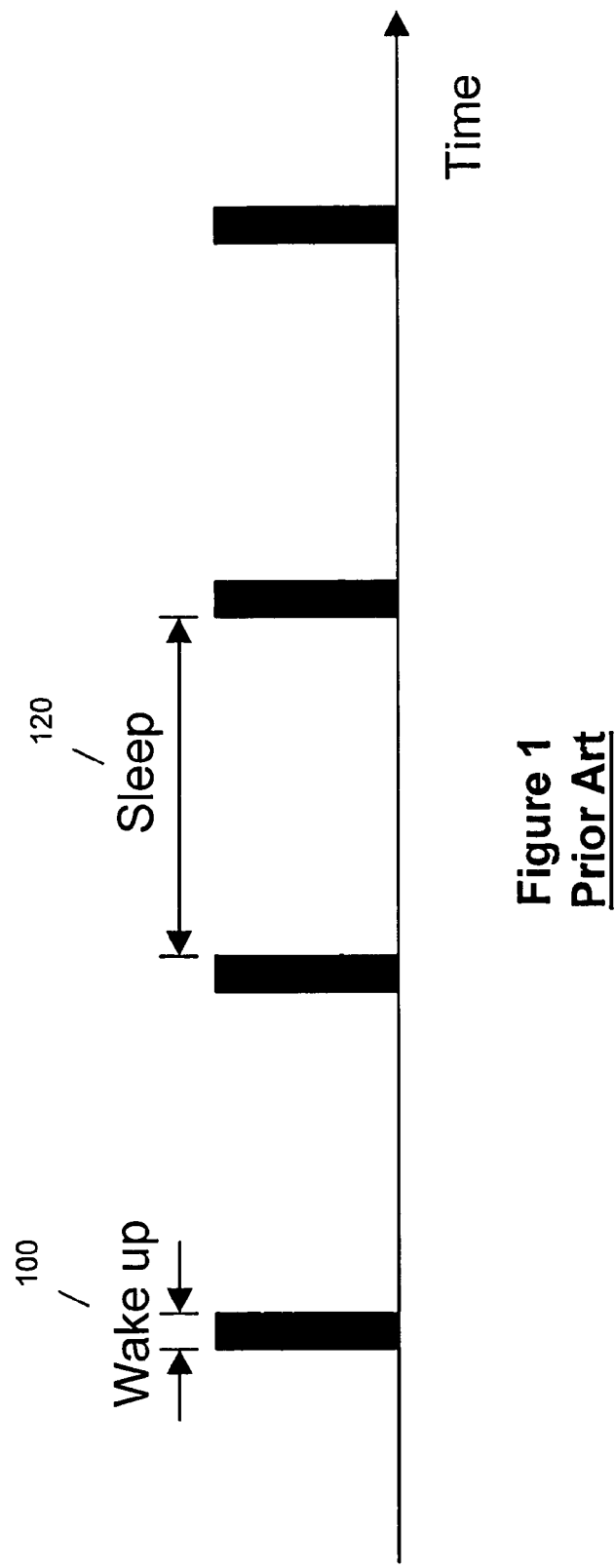
FIG. 1 illustrates a simplified pictorial representation of the concept of duty cycling.

At a wireless communication device, the contributors to the energy consumption are radio transmission, radio receiving, listening, and other processing. In some wireless data networks like a wireless sensor network, the need for data transfer is not persistent at all times. For example, data are transmitted periodically, e.g., once every ten minutes, or data are transmitted only when some rare events such as an intrusion are detected. In either case, the actual traffic load on the network is low, and most of the time the radios are idle. In such wireless data networks, the proportion of the energy spent on the actual radio transmission and receiving is small, as opposed to that spent on listening and other processing. One typical way to conserve energy is to reduce the energy spent on listening by putting the radios into the sleep mode most of the time and waking them up only when there is a need for communication. This prior art technique is referred to as duty cycling, and is illustrated in FIG. 1. The time intervals when the radio is awake 100 are generally much smaller than the time intervals when the radio is asleep 120.

The benefit of duty cycling does not come free of cost. To enable duty cycling, it is necessary for the radios to know when to wake up and when to transmit since a communication is possible only if the transmitter and the receiver can rendezvous at the same time. Various protocols have been proposed in the literature in an attempt to enable efficient rendezvous. Two prior art examples are BMAC and UBMAC.

In BMAC, UBMAC and other existing MAC protocols, during a wake up interval, a receiver receives one packet. This has two ramifications on the performance of the network. The first ramification is energy efficiency. For example, in the case of BMAC, if multiple packets are ready for transmission at a transmitter, the overhead occurs every time a transmission happens. Each packet introduces a fixed communication overhead at the transmitter. The overhead includes the transmission of a preamble of the length of the duty cycle, and a variable communication overhead associated with receiving for an average period of half a wake up cycle at the receiver. The other ramification is the delay associated with the amount of time that it takes to transmit multiple packets which is typically equal to the number of packets times the duration of a wake up cycle.

Figure 2:
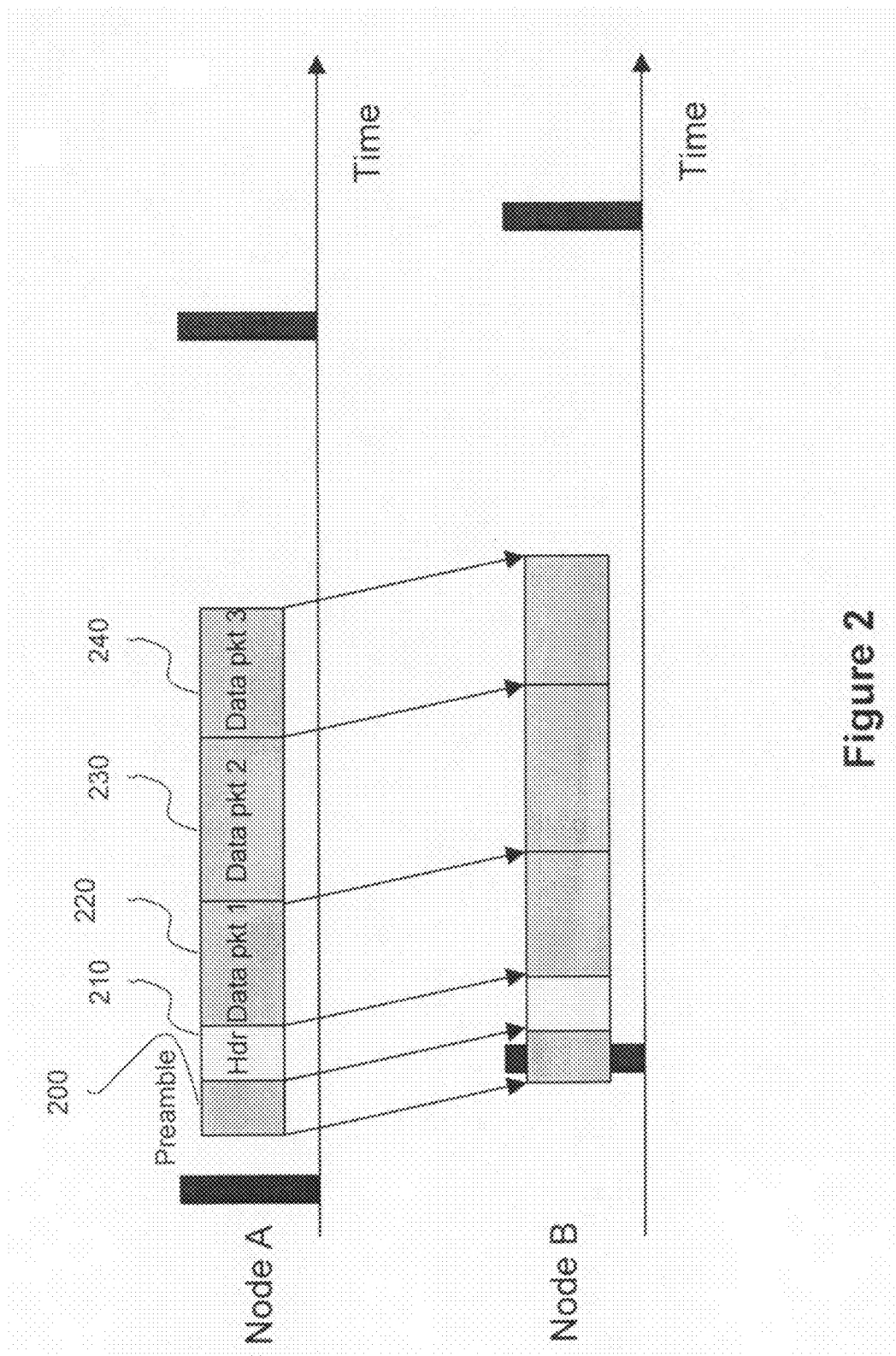
FIG. 2 depicts a simplified pictorial representation of one embodiment of the present disclosure utilizing the transmission of a train of packets without reliability enhancement mechanisms.

To overcome these problems associated with existing protocols, the present disclosure is directed to a transmission scheme where a train of packets is transmitted for each wake up interval. With reference to FIG. 2, a preamble 200 precedes a common physical layer header 210. The physical layer header may include the number of data packets for this train (three in this example) and other information related to the packet such as the modulation scheme. Individual data packets 220-240 follow the header. The data packets may not be the same length. Depending on how much information is contained in the common physical layer header, each data packet may or may not include its own physical layer header. For example, if the common physical layer header contains the information needed to decode each data packet, then each data packet may skip their respective physical layer header. The size of the packet train should be less than the sleep interval so that other nodes in the network can get a fair share of the bandwidth.

The present disclosure also addresses the issue of reliability. The wireless communication links are inherently unreliable and therefore, it is expected that a packet may get lost during transmission. The present disclosure addresses this reliability issue by including an acknowledgement of receipt at each wireless link. Because in a multi-hop wireless data network, a packet to be relayed has already traversed a number of hops in the network, and the network has already spent some energy on this packet, it is important to make uses of the resources already spent. If this packet is lost, the energy spent on the all the transmissions of this packet is wasted. The present disclosure addresses these issues by implementing reliability enhancement mechanisms at the Medium Access Control (MAC) layer. Mechanisms such as Automatic Repeat reQuest (ARQ), Stop-and-Wait, Go-Back-N (GBN) and Selective Repeat, may be used in conjunction with link enhancement mechanism resulting in both improved reliability and augmented energy efficiency.

Figure 3:
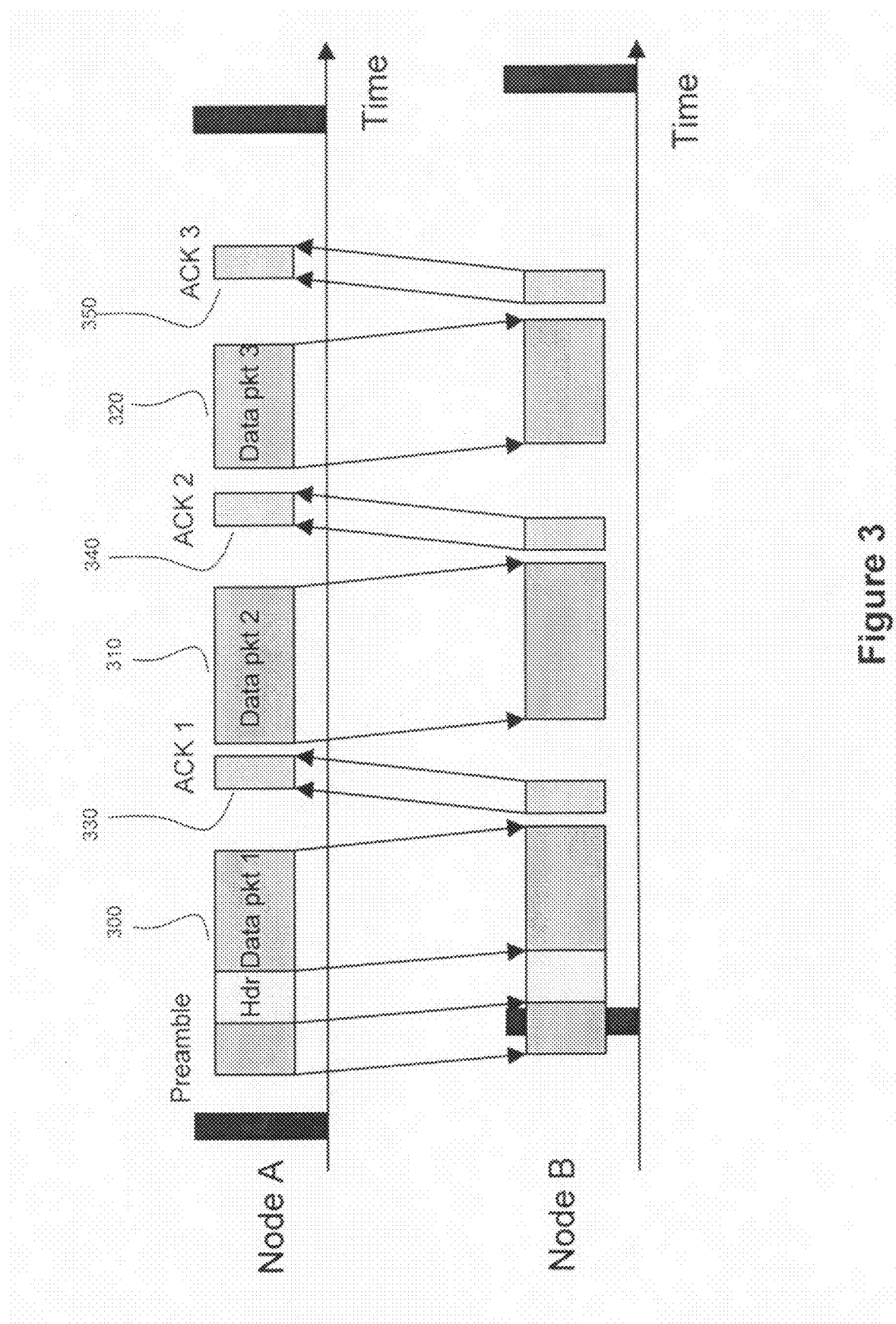
FIG. 3 illustrates a simplified pictorial representation of one embodiment of the present disclosure utilizing the transmission of a train of packets with Stop-and-Wait ARQ.

For example, with respect to FIG. 3, Stop-and-Wait is used for link enhancement. Each data packet 300-320 has a sequence number and the Stop and Wait mechanism ensures that each data packet is received in proper order. For example, after the first data packet 300 is received, Node B transmits and acknowledgement 330 to Node A. Upon receipt of the acknowledgement 330, Node A transmits the second data packet 310. Likewise, upon receipt of the acknowledgement 340 of the receipt of the second data packet 310 at Node B, Node A transmits the third data packet 320 and awaits acknowledgement 350 from Node B. In another embodiment, advanced acknowledgement schemes such as Go-Back-N (GBN) and Selective Repeat could be used for improved throughput and energy-efficiency.

Figure 4:
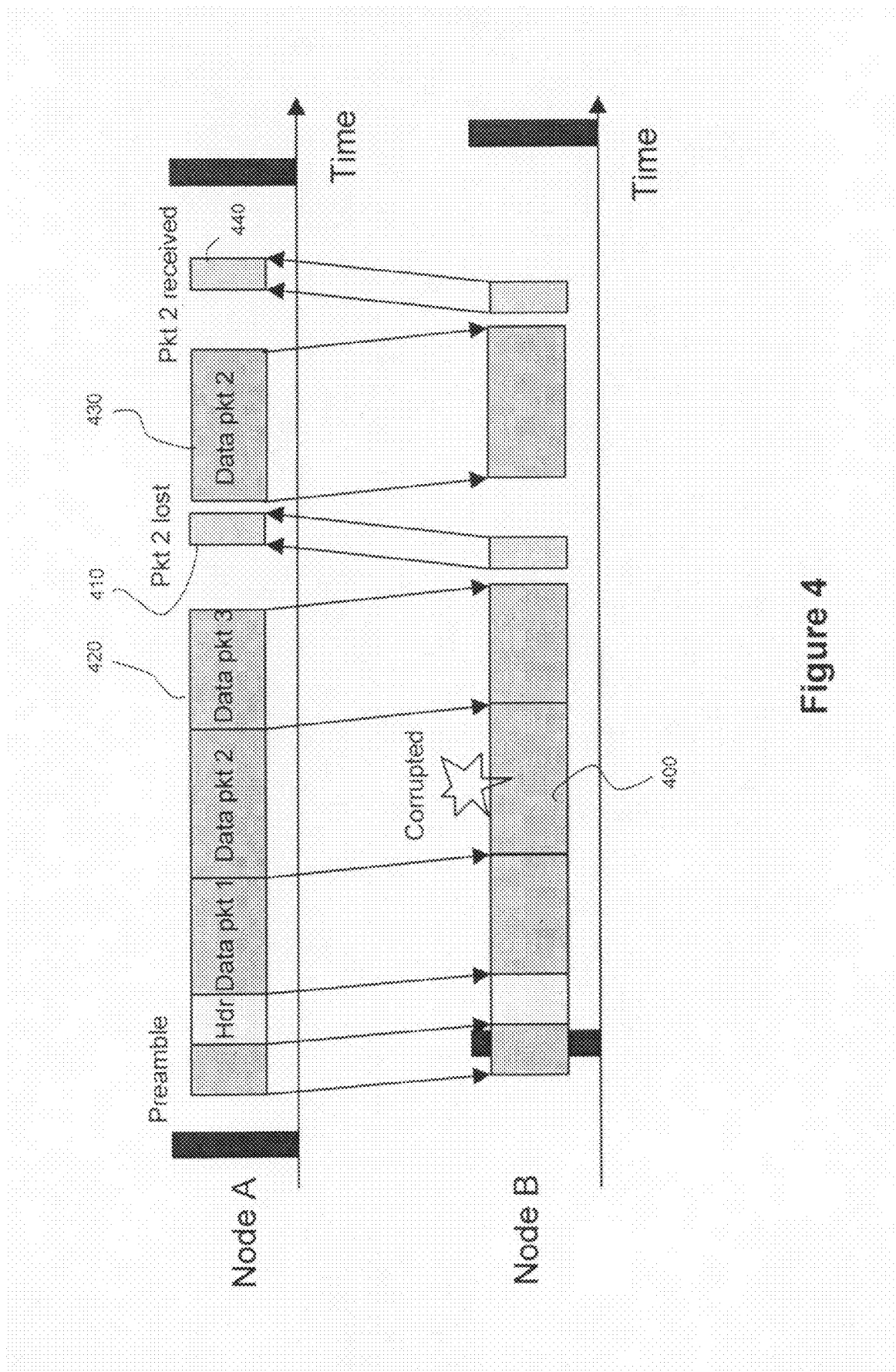
FIG. 4 depicts a simplified pictorial representation of one embodiment of the present disclosure utilizing the transmission of a train of packets with Selected Repeat ARQ.

FIG. 4 illustrates an embodiment utilizing the Selective Repeat link reliability mechanism. For example if Packet 2 is lost 400, this information is fed back to the sender (node A) 410 after packet 3 420 is (the end of the train) received. Node A then retransmits packet 2 430, which is subsequently acknowledged by the receiver (node B) 440.

Another performance metric is responsiveness. In a duty-cycled wireless data network, the wireless devices wake up periodically, and the period is usually preset and fixed for simplicity as previously discussed. For many wireless applications, such as environmental monitoring, a fixed duty cycle provides good enough performance. However, in some other applications, such as intrusion detection, the timing requirement is much more stringent, and the use of a fixed duty cycle may not be sufficient.

To address the problem associated with lack of responsiveness of the current duty cycled wireless data networks, the present disclosure provides for a dual-mode network operation scheme. Normally, the wireless nodes operate in the Normal Mode, which is characterized by a fixed and long wakeup cycle. If an emergency is detected, the portion of the network involved in delivering the emergency information transitions to the Emergency Mode, which is characterized by a much shorter wake up cycle or the lack of duty cycling at all.

The Emergency Mode may provide two options. In one aspect, each node in the portion of network involved in the delivery of the emergency information shortens it duty cycle, i.e., wakes up more frequently. In another aspect, each such node stays awake throughout the delivery of the emergency information.

To make the network operate seamlessly between the two modes, the present disclosure provides two methods which may be implemented. First, during the emergency period, the portion of the network involved in the delivery of the emergency information is identified to smoothly transition the network between the two modes while maintaining energy efficiency.

Second, when a communication node changes its duty cycle, it should notify this change to all of its neighbors so that the communication links remain available through neighboring nodes. For example, the adoption of a shorter wake up cycle or stopping duty cycling may significantly increase the energy consumption of a node. Therefore, for energy efficiency reasons, it may be useful to limit the duty cycle change only to the nodes that have to make such change.

Figure 5:
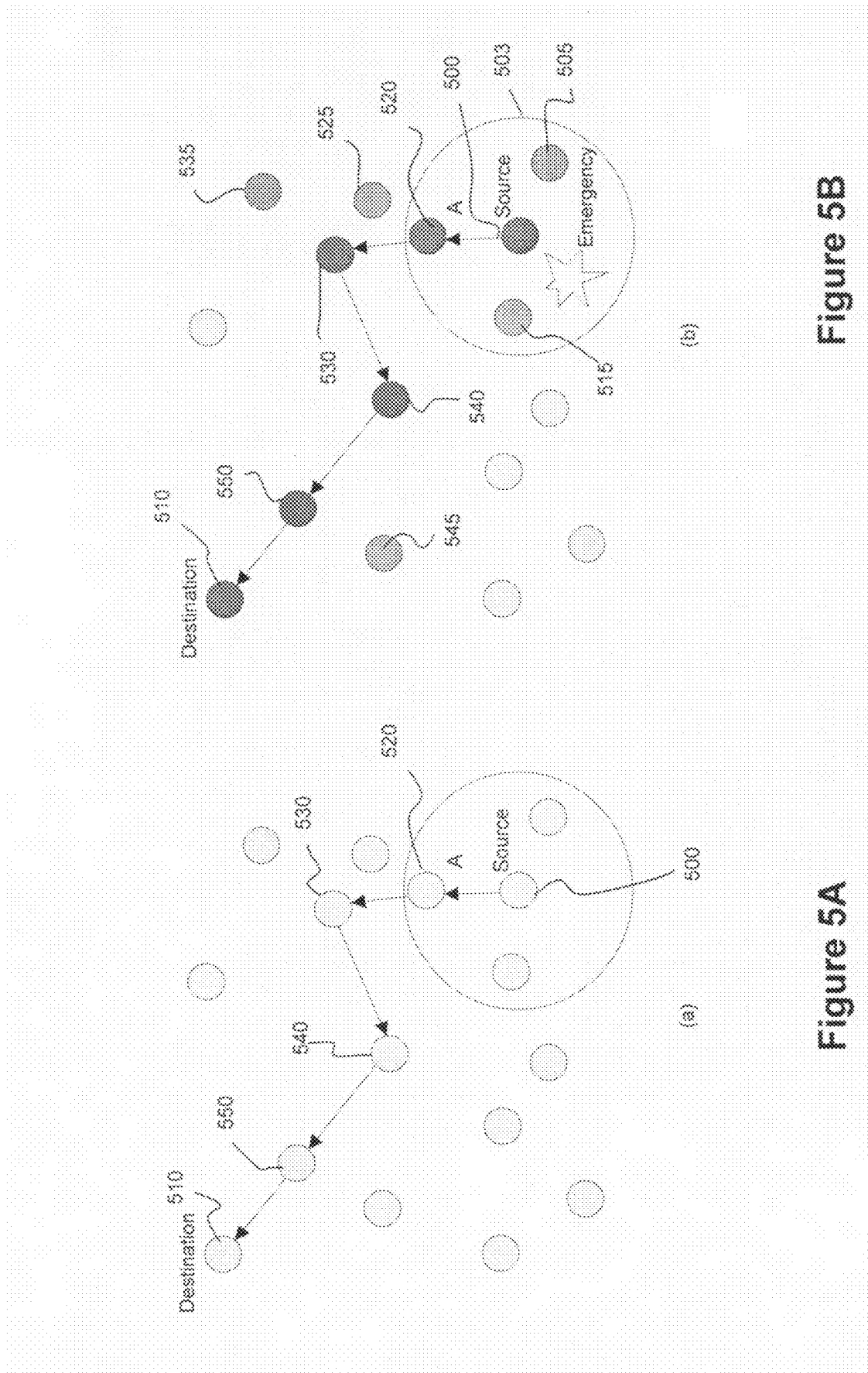
FIG. 5 illustrates a simplified pictorial representation of one embodiment of the present disclosure utilizing the dual mode network operation.

FIG. 5. illustrates an embodiment of efficiently changing duty cycle at selected nodes. FIG. 5A shows a pre-computed path available to route traffic from the Source 500 to the Destination 510. The path may be in a tree or a mesh network topology. FIG. 5B illustrates one embodiment showing that an emergency occurs and the Source 500 decides to report this to the Destination 510. First, it sends a 1-hop broadcast alert message to all of its neighbors. The circle 503 indicates the communication range of the Source 500. Three 1-hop, or adjacent, neighbors receive this alert message, and update their stored information on the new duty cycle of the sender of this alert message, which in this case is the Source 500. Among these neighbors, node A 520 is in the next hop to the Destination 510. Node A may decide to transition to the Emergency Mode by broadcasting an alert message to its own neighbors. This process repeats and eventually, all nodes on the path (Nodes 500, 510, 520, 530, 540, 550) participate in the Emergency Mode, and in addition, the neighbors of these nodes (Nodes 505, 515, 525, 535, and 545) are notified of the change.

Figure 6:
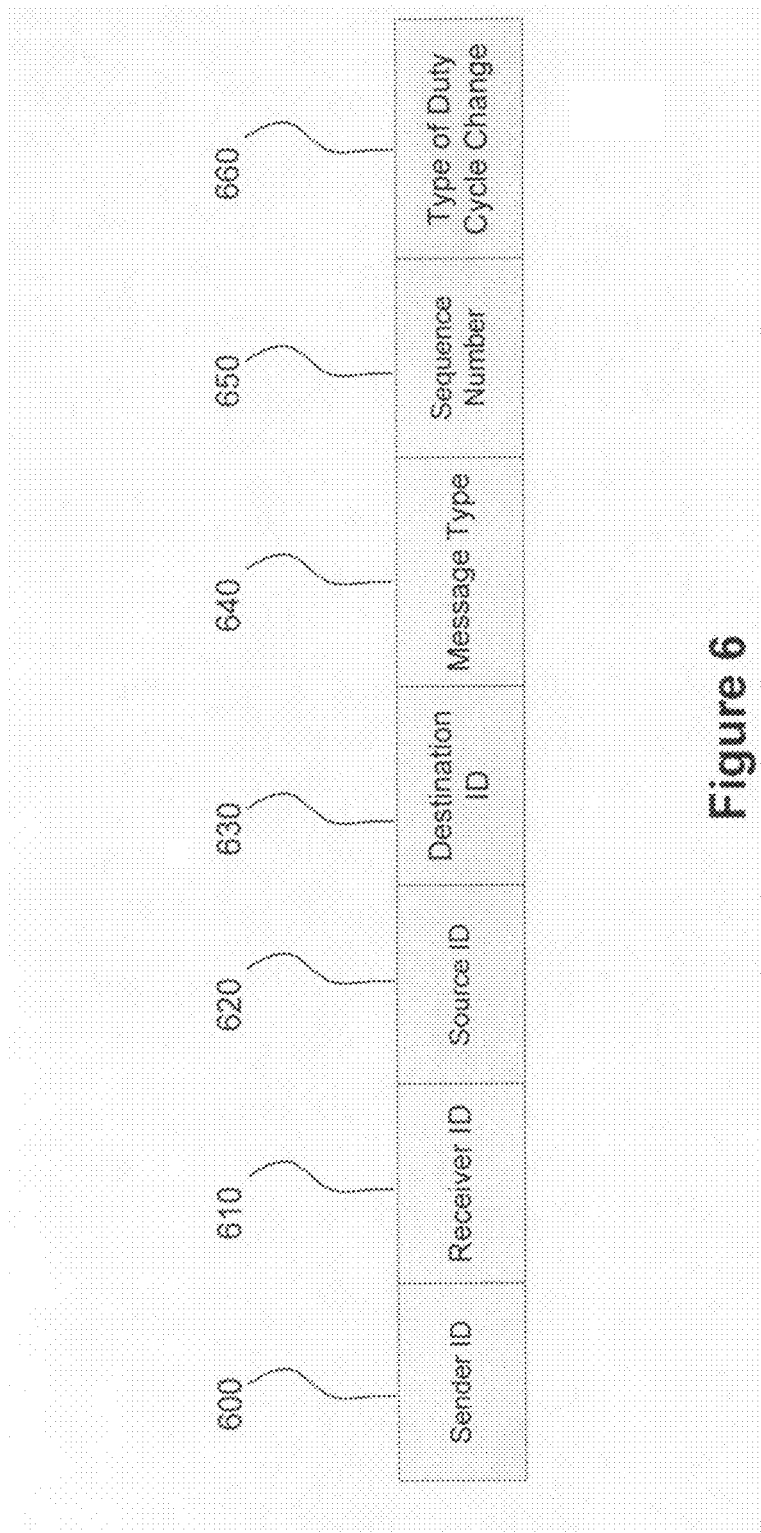
FIG. 6 illustrates a simplified pictorial representation of an embodiment of a packet format for the messages used for the dual mode network operation.

FIG. 6 illustrates an example message format. The message contains the sender 600 of this message, and the intended receiver 610 of this message (next hop). Also contained are the IDs of the original source 620 and the final destination 630 of the upcoming emergency traffic. The message type 640 differentiates whether this is an alert message, or a cancel message, which will be described shortly. The sequence number 650 is used to identify duplicate messages. The "Type of Duty Cycle Change" field 660 indicates whether to shorten the duty cycle interval or simply stop duty cycling.

After the emergency information is completely delivered, the nodes in the Emergency Mode should fall back to the Normal Mode to conserve energy. To enable this fall back, the Source initiates another message, a cancel message. The cancel message is sent to the same set of nodes to which the alert message is sent, namely, the nodes on the path, and their 1-hop neighbors. The way the cancel message propagates is the same as the alert message. For example, if a node is participating in the Emergency Mode, it will in turn broadcast a 1-hop cancel message. For a cancel message, the "Message Type" in FIG. 6 will be "Cancel".

If a node is in the paths of two streams of traffic which have different duty cycle requirements, the node will disregard the duty cycle requirement of lower quality of service.

The nodes in a wireless network may not be identical. In fact, they may have drastic differences in certain aspects, such as energy resource and processing power. The nodes may also possess differences in functionality which may require differing duty cycles. Such a wireless network is called a heterogeneous wireless network. For a heterogeneous wireless network, it is natural to consider a hierarchical architecture that consists of backbone nodes and non-back bone nodes. In this disclosure, the energy resource available to individual nodes is the defining criterion of classifying a node as a backbone node or a non-backbone node. Specifically, for a pre-determined energy threshold, a node is called a high energy node if its remaining energy is greater than the threshold and is called a low-energy node if otherwise. High energy nodes rotate to serve as backbone nodes based on network conditions and energy level at individual nodes. Network conditions are updated periodically through neighbor discovery or synchronization. If the network is dense, in order to avoid draining energy from only a few fixed nodes, periodically or adaptively, topology control techniques (or network reconfiguration) can be applied to select a set of high energy nodes to serve as backbone nodes based on the energy level at those nodes. Non-backbone nodes will be sleeping except when synchronization is needed. The objective of topology control is to select enough backbone nodes so that the network is connected.

Figure 7:
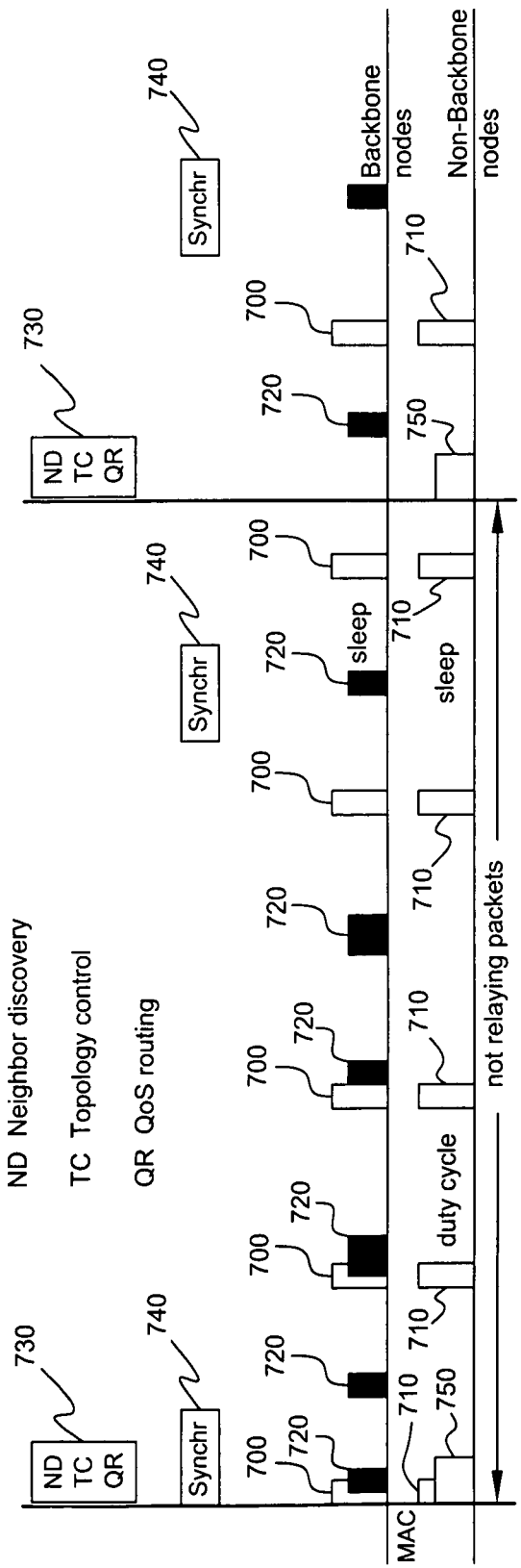
FIG. 7 illustrates one embodiment of the present disclosure utilizing two-level sleeping duty cycling for a heterogeneous wireless network.

Once the backbone network is selected, routing can be done by selecting paths within the backbone nodes which minimizes energy consumption. Once topology and routing are determined, data transmission can take place over the backbone network by selecting appropriate medium access control (MAC) modality and time synchronization algorithm. In this disclosure, a two-level design of scheduling can be utilized. As shown in FIG. 7, the non-backbone nodes do duty cycling by waking up periodically during intervals 710. The backbone nodes also wake up during the same time intervals 700. The two types of nodes exchange information during those same intervals 700 and 710. However, The non-backbone nodes are not responsible to relay traffic for other nodes, whereas the backbone nodes are responsible to relay traffic for other nodes. The backbone nodes may perform some MAC layer transmissions and receiving 720.

The neighbor discovery, topology control and quality of service routing are conducted at a relatively long time scale 730, for example, in minutes or hours, while synchronization 740 and MAC 750 are done at a relatively short time scale. Thus, in one embodiment, for a heterogeneous wireless network: (1) Due to node heterogeneity, a hierarchical architecture consisting of backbone nodes and non-backbone nodes is used. Only backbone nodes are responsible for relaying data. (2) The network is frequently reconfigured so that nodes can serve as backbone nodes adaptively based on energy level or in an alternate fashion with a relatively long period. The length of such a period is a design parameter, which is determined by the frequency of the network conditions change. (3) Synchronization and MAC are done at a relative short time scale. (4) There are two types of availability schedules, one for backbone nodes and one for non-backbone nodes. Non-backbone nodes are not used for relaying data where backbone nodes are used.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed:

1. A method of medium access control for a wireless communication network having a plurality of wireless nodes, each wireless node having a duty cycle which controls a sleep mode and a wake-up mode, the method comprising:

detecting an alert event at a source node;

classifying each node of the plurality of nodes as a backbone node if a remaining energy of the node is greater than a pre-determined energy threshold, wherein the backbone nodes are available for relaying data for other nodes;

classifying each node of the plurality of nodes as a non-backbone node if a remaining energy of the node is less than or equal to the pre-determined energy threshold, wherein the non-backbone nodes are available to exchange information with other nodes and are not available for relaying data for other nodes;

determining a communication path between a source node and a destination node;

identifying each node in the communication path;

at each node in the communication path, changing the duty cycle of the node and transmitting an alert message to each wireless node adjacent to the transmitting node to indicate the change in duty cycle;

at each adjacent node, storing the duty cycle change of the transmitting node; and transmitting a message from the source node to the destination node via one or more of the backbone nodes through the identified communication path.

2. The method of claim 1 further comprising the step of:

at each node in the communication path, returning to the original duty cycle of the node by transmitting an alert message to each wireless node adjacent to the transmitting node in the communication path to indicate the change in duty cycle.

3. The method of claim 1 wherein the alert event is provided by a sensor.

4. The method of claim 3 wherein the sensor monitors environment conditions.

5. The method of claim 3 wherein the sensor is an intrusion detector.

6. A method of medium access control for a wireless communication network having a plurality of wireless nodes, each wireless node having a sleep mode and a wake-up mode and being powered by an energy source, the method comprising:

classifying some of the plurality of nodes into backbone nodes and some of the plurality of nodes as non-backbone nodes based as a function of the remaining amount of energy at each node, wherein a backbone node has a remaining energy that is greater than a pre-determined energy threshold, and a non-backbone node has a remaining energy that is less than or equal to the pre-determined energy threshold;

making the backbone nodes available for relaying data for other nodes; and making the non-backbone nodes available to exchange information with other nodes and making the non-backbone nodes not available for relaying data for other nodes.

7. The method of claim 6 wherein the step of classifying is performed periodically.

8. The method of claim 6 wherein the backbone nodes and the non-backbone nodes are made available for transferring their own data.

9. A system providing medium access control for a wireless communication network, the system comprising:

a plurality of wireless nodes, each wireless node having a duty cycle which controls a sleep mode and a wake-up mode; and a processor programmed to:

detect an alert event at a source node;

classify each node of the plurality of nodes as a backbone node if a remaining energy of the node is greater than a pre-determined energy threshold, wherein the backbone nodes are available for relaying data for other nodes;

classify each node of the plurality of nodes as a non-backbone node if a remaining energy of the node is less than or equal to the pre-determined energy threshold, wherein the non-backbone nodes are available to exchange information with other nodes and are not available for relaying data for other nodes;

determine a communication path between a source node and a destination node;

identify each node in the communication path;

at each node in the communication path, change the duty cycle of the node and transmitting an alert message to each wireless node adjacent to the transmitting node to indicate the change in duty cycle;

at each adjacent node, store the duty cycle change of the transmitting node; and transmit a message from the source node to the destination node via one or more of the backbone nodes through the identified communication path.

10. A system for providing medium access control for a wireless communication network, the system comprising:

a plurality of wireless nodes, each wireless node having a sleep mode and a wake-up mode and being powered by an energy source; and processor programmed to:

classify some of the plurality of nodes into backbone nodes and some of the plurality of nodes as non-backbone nodes based as a function of the remaining amount of energy at each node, wherein a backbone node has a remaining energy that is greater than a pre-determined energy threshold, and a non-backbone node has a remaining energy that is less than or equal to the pre-determined energy threshold;

make the backbone nodes available for relaying data for other nodes; and make the non-backbone nodes available to exchange information with other nodes and making the non-backbone nodes not available for relaying data for other nodes.

* * * * *